United States Patent
Halemba et al.

(10) Patent No.: US 6,764,595 B1
(45) Date of Patent: Jul. 20, 2004

(54) FLUID TREATMENT SYSTEM

(75) Inventors: Peter Halemba, Russell, OH (US); George Ellis, III, East Claridon, OH (US)

(73) Assignee: Kinetico Incorporated, Newbury, OH (US)

( * ) Notice: Subject to any disclaimer, the term of this patent is extended or adjusted under 35 U.S.C. 154(b) by 0 days.

(21) Appl. No.: 10/009,091

(22) PCT Filed: Mar. 15, 2000

(86) PCT No.: PCT/US00/06848
§ 371 (c)(1), (2), (4) Date: Jul. 22, 2002

(87) PCT Pub. No.: WO01/68227
PCT Pub. Date: Sep. 20, 2001

(51) Int. Cl.⁷ .......................... B01D 61/10; B01D 61/12
(52) U.S. Cl. .................... 210/110; 137/590; 220/4.12; 220/495.01; 210/134; 210/137; 210/257.2
(58) Field of Search .......................... 210/97, 109, 110, 210/116, 134, 137, 257.2, 259, 321.65, 541; 137/386, 395, 590; 220/4.12, 495.01

(56) References Cited

U.S. PATENT DOCUMENTS

| | | | |
|---|---|---|---|
| 4,579,242 A | 4/1986 | Ellis, III | |
| 4,585,554 A | * 4/1986 | Burrows | 210/110 |
| 4,604,194 A | 8/1986 | Entingh | 210/98 |
| 4,629,568 A | * 12/1986 | Ellis, III | 210/636 |
| 4,650,586 A | 3/1987 | Ellis, III | 210/636 |
| 4,705,625 A | 11/1987 | Hart, Jr. | 210/110 |
| 4,776,952 A | 10/1988 | Burrows | 210/110 |
| 4,885,085 A | * 12/1989 | Beall, Jr. | 210/137 |
| 4,997,553 A | 3/1991 | Clack | 210/97 |
| 5,662,793 A | 9/1997 | Beall, Jr. | 210/134 |

* cited by examiner

Primary Examiner—Joseph Drodge
(74) Attorney, Agent, or Firm—Watts Hoffmann Co., LPA

(57) ABSTRACT

A water treatment system having a reverse osmosis unit (14) includes a storage tank (40) having an outer tank housing (42) that encloses an expandable bladder (50). A pressurized region (62) is defined between the outside of the bladder (50) and inside of the housing (42). A control valve assembly (44) controls communication of source water under pressure to pressurizing region (62) and communicates the region (62) with a drain (22). The assembly (44) includes a pilot valve (70) that is responsive to a state of dispensing and includes a valve element (76) that moves between a first dispensing position and a second non-dispensing position. A servo valve (72) is responsive to position of the pilot valve (70) and communicates source water under pressure to the region (62) when the pilot valve (70) is in the first position thus applying pressure to bladder (50) to expel treated water and communicates region (62) to the drain (22) when dispensing is not occurring so as to allow bladder (50) to expand as it receives treated water from the reverse osmosis unit (14).

13 Claims, 7 Drawing Sheets

FLUID TREATMENT SYSTEM

This application is a 371 of PCT/US00/06848, filed 15 Mar. 2000.

TECHNICAL FIELD

The present invention relates generally to fluid treatment Systems and, in particular, to a storage tank and storage tank control valve for use with a fluid treatment system, such as a reverse osmosis system.

BACKGROUND ART

It is known to use a storage tank to store a processed fluid produced by a fluid treatment system. For example, reverse osmosis systems are used to produce potable or drinking water from water sources that contain undesirable contaminants, etc. In a typical reverse osmosis system, especially in the type of reverse osmosis system used in homes, the rate at which treated water or "permeate" is produced by the system can be very low. As a result, a storage tank is used to store permeate, so that relatively large quantities can be made available when the consumer opens the tap or faucet. In the past, "precharged" storage tanks are used. In this type of storage tank, a bladder is used to define a pressurized chamber, usually filled with a compressible gas, such as nitrogen. The bladder isolates the gas from the processed water received by the tank. As processed water or "permeate" (in the case of a reverse osmosis system) is received by the tank, it gradually compresses the gas in the pressurized chamber. As a result, the permeate is stored under pressure, such that when the faucet is opened, the pressure in the storage tank exerted by the compressed gas, forces permeate out of the tank and to the faucet.

Although these storage tanks are widely used and provide a suitable means for storing permeate, they do have a significant drawback. As more and more permeate is received by the tank, the pressure needed to effect flow of permeate into the tank increases because as the gas chamber is compressed, forces on the bladder increase. Accordingly, in order to completely fill the storage tank, a significant pressure must be applied to the permeate as the capacity of the tank is reached. This resistance to flow exerted by the tank in itself decreases production rate of the reverse osmosis system, since the reverse osmosis system relies on differential pressures between the source and the output to effect flow across the membrane. In addition, as permeate is discharged by the tank, its delivery pressure is gradually reduced as the pressurized gas chamber expands. As a result, the delivery pressure varies significantly between a full tank and a nearly empty tank.

DISCLOSURE OF INVENTION

The present invention provides a new and improved fluid treatment system that includes a storage system for storing processed fluid such as water. The storage system receives the processed fluid at substantially zero pressure and discharges the stored fluid at a pressure that is substantially the pressure of the source of fluid being treated.

In the preferred and illustrated embodiment, the invention is disclosed in connection with a reverse osmosis unit. It should be understood, however, that the invention has broader applicability and should not be limited to a reverse osmosis application.

In accordance with the invention, a storage system is disclosed for storing treated or processed water discharged by a water treatment unit. The storage system includes a tank assembly having an outer tank housing that encloses an expandable bladder. A pressurizing region is defined between an outside of the bladder and an inside of the outer tank housing. A control valve is disclosed that controls the communication of source water under pressure with the pressurizing region and also controls the communication of the pressurizing region with a drain, so that under predetermined operating conditions, source water in the pressurizing region is allowed to flow to a drain in order to allow the bladder to expand as it receives treated water.

In the illustrated embodiment, the control valve includes a fluid pressure operated control device that is responsive to a dispensing device through which the treated water is dispensed. In particular, the control device is operative to connect the source water to the pressurizing region when the dispensing device is dispensing treated water and is operative to communicate the pressurizing region with the drain when the dispensing device is not dispensing water.

In the preferred embodiment, the control device includes a pilot valve responsive to fluid pressure in a supply conduit feeding the dispensing device and is movable between at least two positions. A servo valve also forms part of the control device and is responsive to the positions of the pilot valve.

The pilot valve includes a source water port, a common port and a drain port and further includes a piston operated flow control member for controlling the communication between the common port and the source port and between the common port and the drain port. Similarly, the servo valve includes a source water port, a common port and a drain port, as well as a piston operated flow control member for controlling the communication of the common port with either the source water port or the drain port. The ports of the servo valve are sized to permit relatively unrestricted flow and, hence, the servo valve controls the flow of source water to the pressurizing region of the tank assembly, and the flow of source water from the pressurizing region to the drain.

In a more preferred embodiment, the water treatment unit disclosed is a reverse osmosis nodule having a permeate output, a source water input and a concentrate output. In the illustrated reverse osmosis system a prefilter is positioned upstream of the reverse osmosis module and fitter source water before it enters the reverse osmosis unit and the pressurizing region of the tank. According to a further feature of this embodiment, a post filter filters permeate before it is delivered to the dispensing device, e.g., a faucet or tap.

According to a preferred embodiment, the control valve assembly for controlling the pressurization and depressurization of the pressurizing region of the tank is mounted directly to the tank. In accordance with this embodiment, the tank includes an internally threaded neck which is adapted to receive external threads formed on the control valve or housing. The control valve assembly is threaded into the neck of the tank and is easily removed for service or replacement.

According to another feature of the invention, a lower portion of the control valve assembly includes a depending, threaded segment which, in conjunction with a internally threaded retaining nut serves as a securement for the elastomeric bladder contained within the tank. According to this preferred embodiment, the retaining nut includes a radial flange which supports a bladder retaining bearing. As the retaining nut is threaded onto the lower segment of the valve, the bearing captures a neck of the bladder between itself and a tapered segment on the control valve, thus securing the bladder to the control valve. The bearing ring facilitates rotation of the retaining nut when either installing or removing the bladder.

Additional features of the invention will become apparent and a fuller understanding obtained by reading the following detailed description made in conjunction with the accompanying drawings.

BEST MODE FOR CARRYING OUT THE INVENTION

Figure 1:
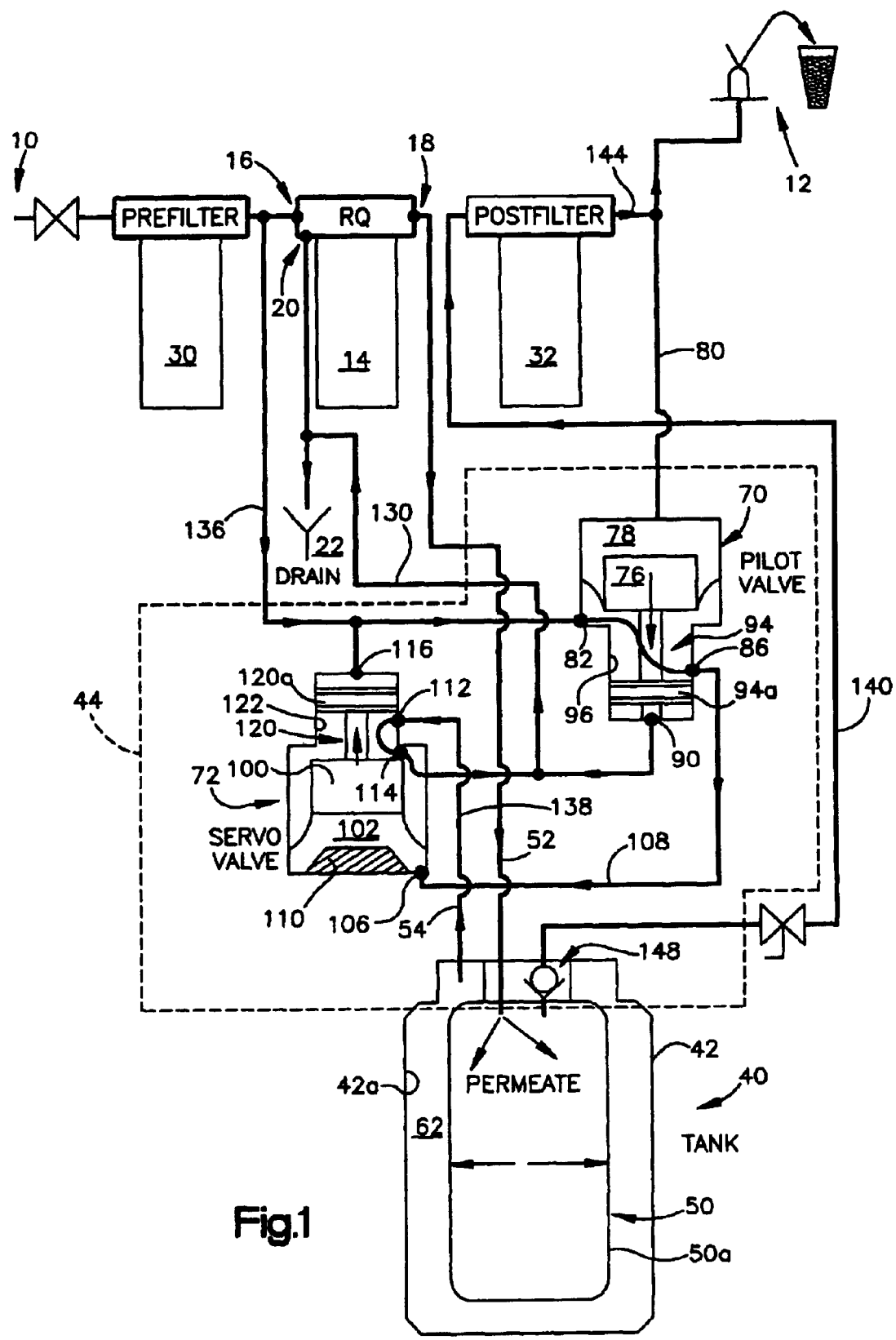
FIG. 1 is a schematic representation of a reverse osmosis system constructed in accordance with the preferred embodiment of the invention, shown in a state in which it is delivering treated water or permeate.
Figure 2:
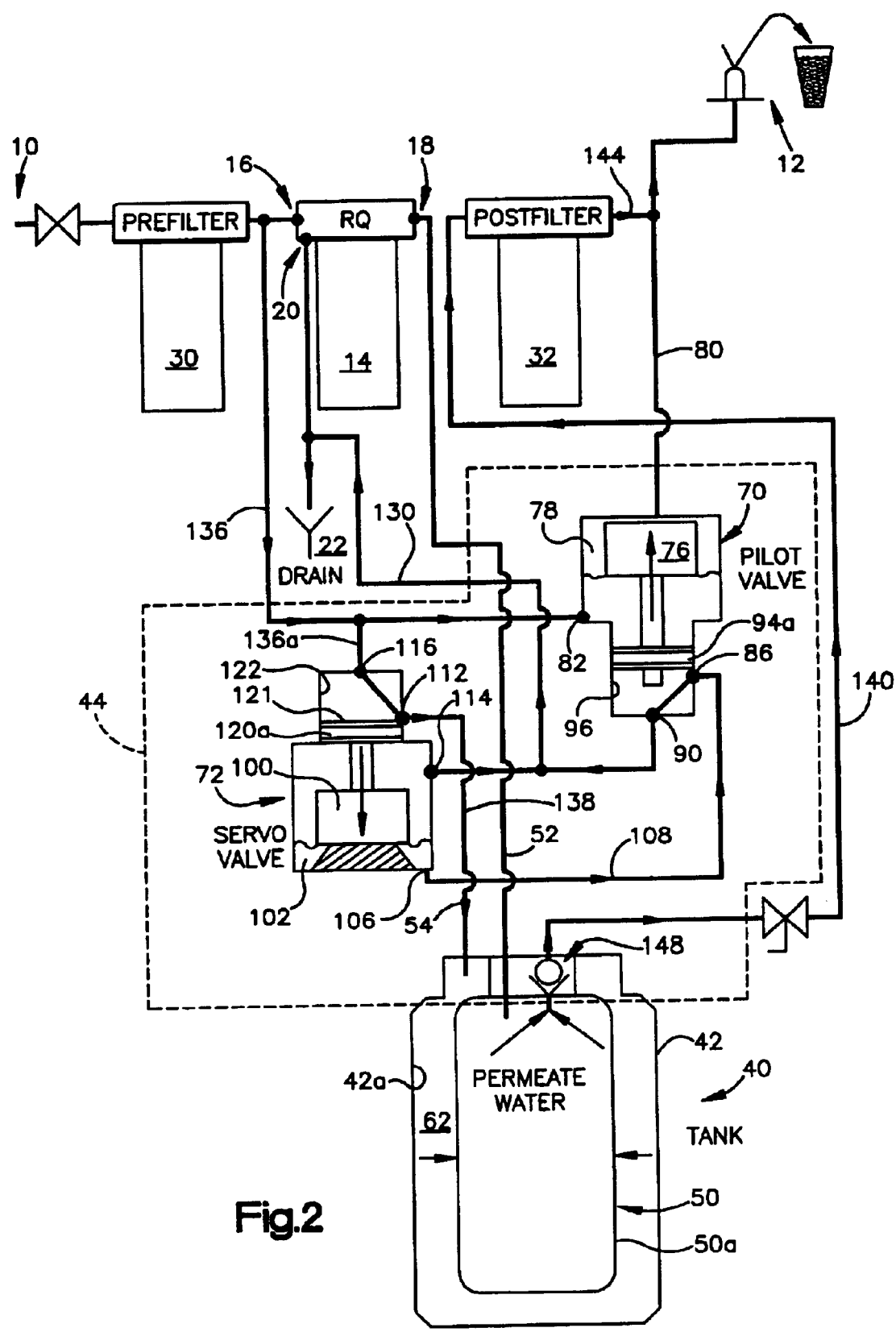
FIG. 2 is another schematic representation of the reverse osmosis system shown in a state in which it is not delivering permeate.
Figure 3:
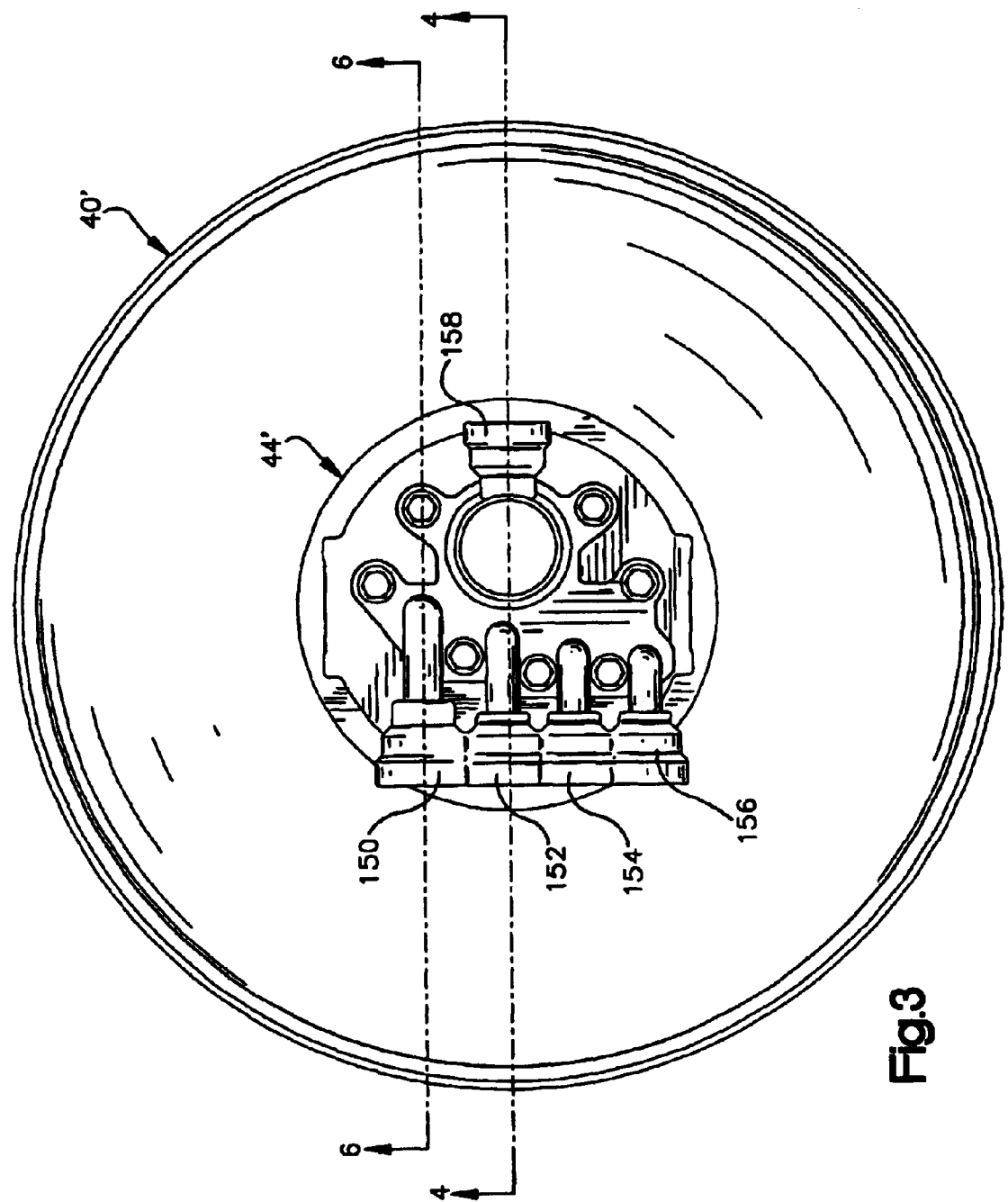
FIG. 3 is a top plan view of a control valve and associated storage tank assembly constructed in accordance with the preferred embodiment of the invention.

FIGS. 1 and 2 schematically illustrate a reverse osmosis system for producing potable water and that embodies the present invention. FIG. 1 schematically illustrates the operation of the system when processed water is not being delivered, i.e., a tap or faucet is closed; whereas FIG. 2 illustrates the operation of the system when processed water is being delivered to a tap or faucet.

The system is connected to a source of water to be processed, indicated generally by the reference character 10. In the illustrated embodiment, the processed water is delivered to a faucet indicated generally by the reference character 12. The illustrated system includes a conventional reverse osmosis (RO) unit 14. Those skilled in the art will recognize that the RO unit 14 houses a reverse osmosis membrane (not shown) and includes an inlet port indicated generally by the reference character 16, through which the unit 14 receives water to be processed from the source 10. The unit 14 also includes a permeate outlet port indicated generally by the reference character 18 and a "concentrate" output indicated generally by the reference character 20 which communicates with a drain 22. The RO unit 14 may operate in a conventional manner. As is known, water to be processed is communicated to the inlet port 16 and is delivered to an internal chamber (not shown) containing the reverse osmosis membrane. Relatively pure water termed "permeate" is allowed to pass or permeate through the membrane and is discharged from the unit 14 by way of the permeate outlet port 18. Contaminants and other material remain on the input or concentrate side of the membrane and are ultimately discharged through the concentrate output 20 and dumped to the drain 22. A thorough explanation of the operation of an RO unit that may be utilized with the present invention can be found in U.S. Pat. Nos. 4,629,568 and 4,650,586, which are owned by the assignee of the present application and are hereby incorporated by reference.

The illustrated system also includes a prefilter 30 which filters large particle contaminants out of the source water to inhibit plugging of the reverse osmosis unit and a post filter 32 for performing a final filtering or "polishing" of the treated water before delivery to the faucet 12. The post filter 32 may be in the form of a carbon filter to further improve the quality and taste of the processed water. The prefilter 30 and post filter 32 are considered conventional and do not form part of the present invention.

Permeate produced by the RO unit 14 is delivered to the faucet 12 from a storage tank 40 under the control of a control valve assembly indicated by the phantom line 44. As will be explained, the tank 40 and control valve 44 may form a single, integrated assembly.

The tank 40 includes a relatively rigid outer housing 42 and an internal elastomeric bladder 50. The bladder 50 is the component which actually stores permeate and expands to accommodate permeate delivered to the bladder via passage 52. As permeate is delivered to the bladder 50, the bladder expands until it fully conforms to an inside surface 42a of the tank at which time the tank is considered full or at capacity.

Permeate in the bladder 50 is delivered to the faucet 12 by pressurizing an outside surface 50a of the bladder 50 with water at source pressure via passage or line 54. To facilitate the explanation, the region between the outside surface 50a of the bladder 50 and the inside surface 42a of the tank shell 42 will be referred to as a region 62. The pressurization and depressurization of the region 62 is controlled by the control valve assembly 44.

As seen schematically in FIGS. 1 and 2, the control valve assembly 44 includes a pilot valve 70 and a servo valve 72. As will be explained, the pilot valve 70 responds to the opening and closing of the faucet 12. The servo valve 72 controls the pressurization and depressurization of the region 62 and, in particular, controls the communication of the source water to the region 62 and the venting of the region 62 to the drain 22. The position or state of the servo valve 72 is controlled by the pilot valve 70.

The pilot valve 70 includes a diaphragm/piston 76 and a isolated piston chamber 78. When the piston chamber 78 is pressurized the piston 76 is driven downwardly to the position shown in FIG. 1. As will be explained, the piston chamber is pressurized via a signal passage 80 which pressurizes when the faucet is closed. Referring also to FIG. 2, the pilot valve 70 includes a source water port 82, a common port 86 and a drain port 90. A spool-like element 94 defining a single land 94a is connected to the piston 76 controls the communication between the source port 82 and the drain port 90 with the common port 86. The spool member 94 reciprocates within a spool chamber 96. As seen in FIG. 1, when the faucet 12 is closed, the source water port 82 is communicated with the common port 86.

The servo valve 72 is similar in operation to the pilot valve 70. However, the servo valve is constructed such that it can sustain much higher flow rates through its ports. The servo valve 72 includes a diaphragm supported piston 100 and an isolated, piston actuation chamber 102. The servo valve 72 includes a piston chamber port 106 which is connected via signal line or passage 108 to the common port 86 of the pilot valve 70. When the piston chamber 102 is pressurized, the piston 100 is driven upwardly (as viewed in FIG. 1) to the upper position shown in FIG. 1. In the absence of fluid pressure in the piston chamber 102, the piston 100 moves downwardly to the position shown in FIG. 2 at which point it abuts a stop 110.

The servo valve 72 includes a common port 112, a drain port 114 and a source water port 116. The fluid communication between these ports is controlled by a spool element 120 having a single land 120a. The spool element is connected to and is preferably integrally formed with the piston 100. The land 120a reciprocated within a spool chamber 122. The ports 112, 114 and 116 communicate with the spool chamber 122.

Referring first to FIG. 1, when the servo valve piston 100 (and hence the land 120a) is moved to its upper position as viewed in FIG. 1, the common port 112 is communicated with the drain port 114 via the spool chamber 122. In this position, water in the region 62 of the tank 40 is allowed to proceed to the drain 22 via tank line 54, which communicates with spool chamber 122 via the common port 112. The source water then flows out of the spool chamber 122 through the drain port 114 and is communicated to the drain 22 via a common drain line 130. Thus, as the bladder 50 expands to receive permeate being produced by the RO unit 14 during water production, any source water is driven out of region 62 and is discharged to the drain 22. This allows the bladder 50 to expand completely to conform to the inside surface 42a of the tank shell 42.

The piston 100 of the servo valve 72 is driven to the upper position as viewed in FIG. 1 by a signal pressure received from the pilot valve 70. In particular, when the faucet is closed the pilot valve chamber 78 is pressurized driving the piston 76 downwardly to the position shown in FIG. 1. In this position, source water is communicated to the spool chamber 96 via the source water port 82. The water in the spool chamber 96 is delivered to the servo valve piston chamber 102 via the common port 86 of the pilot valve 70 and the signal line 108. As explained above, in this state, source water in the region 62 is vented to the drain 22 and the permeate in the bladder 50 is at substantially zero pressure. It should be noted that the bladder 50 does exert some minimal pressure on the permeate due to its resistance to expansion.

The inside of the bladder 50 is communicated with the output port 18 of the RO unit 14 via the supply line 52. Since the pressure in the bladder 50 is substantially zero, the RO unit 14 begins producing permeate and delivering that permeate to the bladder 50 via the supply line 52. As the bladder 50 expands, source water in the region 62 is discharged to the drain 22 via the circuit explained above.

Referring now to FIG. 2, the operation of the system when permeate is being dispensed from the faucet 12 is as follows. When the faucet 12 is opened, pressure in the signal line 80 drops to substantially zero. The absence of pressure in the pilot chamber 78 allows the source water pressure communicated to the spool chamber 96 via source water line 136 and source port 82 to drive the piston 76 to its upper position shown in FIG. 2. In this position, the pilot valve common port 86 is communicated with the drain port 90. As a consequence, fluid in the servo valve piston chamber 102 is allowed to proceed to the common drain line 130 and, hence, the drain 22 via signal line 108 and the spool chamber 96 of the pilot valve 70. As seen in FIG. 2, when the land 94a is in its upper position as viewed in FIG. 2, the spool chamber 96 cross communicates the common port 86 and the drain port 90.

The communication of the servo valve piston chamber 102 with the drain 22 causes the servo valve piston 100 to move downwardly (as viewed in FIG. 2) due to the application of source water pressure to an upper surface 121 (as viewed in FIG. 2) of the land 120a of spool 120 via the source water line 136, branch line 136a and port 116. When the piston moves to its lower position (as viewed in FIG. 2) the source water port 116 of the servo valve 72 is communicated with its common port 112. This allows source water pressure to flow into the tank region 62 via the source water line 138. The application of source water pressure to the region 62 produces a contraction force on the permeate bladder 50 driving permeate from the bladder to the open faucet 12 via the permeate supply line 140 which communicates with the post filter 32. The post filter 32 in turn communicates with is the faucet 12 via branch line 144. It should be noted here that the supply line includes a check valve 148 which prevents reverse flow of the permeate in the line into the tank 40 and maintains pressurization of the line 140 when the faucet 12 is closed.

It should also be noted here that both the pilot valve 70 and servo valve 72 are operated by differential pressures applied to their associated pistons. Turning first to the pilot valve 70, the effective pressure area of the piston chamber side of the piston/diaphragm is equal to the cross-sectional area of the piston chamber 78. The effective pressure area of the underside of the diaphragm/piston (which is exposed to the fluid pressure in the spool chamber 96) is equal to the cross-sectional area of the piston chamber 96 minus the cross-sectional area of the control element or spool member 94. Thus, if source water pressure is applied to the spool chamber 96 of the pilot valve 70 via the source port 82 concurrently with the application of permeate pressure as exerted by source water pressure in the region 62, a net upwardly directed force is applied to the piston/diaphragm 76 (as viewed in FIG. 2), which causes the piston to move upwardly.

The same relationship exists for the servo valve piston/diaphragm so that when source water pressure is applied to the servo valve piston chamber 102, concurrently with source water pressure applied to the end surface 121 of the control spool/land 120a via the source water port 116 of the servo valve 72, a net upwardly directed force is applied to the piston/diaphragm 100 causing the piston to move to its upper position shown in FIG. 1.

With the present system, the overall delivery rate and permeate production are substantially improved. During permeate production, i.e., when the faucet 12 is closed, the permeate reservoir (as provided by the bladder 50) is at substantially zero pressure and, hence, the RO unit 14 sees very little resistance to flow thus maximizing flow through the RO unit 14. During delivery of permeate through the faucet 12, substantially full supply pressure is applied to the bladder 50 and, hence, permeate is delivered to the faucet 12 at substantially source pressure minus pressure losses due to flow restrictions due to lines and passages. As a consequence, the flow rate of permeate from the faucet 12 is substantially constant since at all times supply pressure is applied to the exterior surface of the bladder 50 as compared to bladder tanks that utilize a precharge which results in reduced pressure as permeate in the tank is depleted.

Turning now to FIG. 3–7, a control valve and tank assembly constructed in accordance with the preferred embodiment of the invention is illustrated. For purposes of reference, the apparatus shown in FIGS. 3–7 generally corresponds to the items referenced as 44 and 40 in FIGS. 1 and 2. To facilitate the explanation, like components in the apparatus shown in FIGS. 3–7 will be given the same reference characters used in FIGS. 1 and 2 followed by an apostrophe.

Accordingly, the control valve/storage tank assembly includes a control valve 44' which is threadedly received by a tank 40'. As previously described, the tank 40' includes a relatively rigid tank shell 42' having an inside surface 42a'. In the illustrated embodiment the tank is made from two tank halves that are joined by a spin welding process. Details of this type of tank construction can be found in U.S. Pat. No. 4,579,242 that is owned by the present assignee and is hereby incorporated by reference. The bladder 50' is disposed within the tank shell 42' and expands to receive permeate and contract to expel permeate. The region 62' located between the outside of a bladder 50' and the inside 42a' of the tank 42' receives source water in order to apply contracting forces on the bladder to expel permeate, whenever the faucet 12 (shown in FIGS. 1 and 2) is opened.

Figure 5:
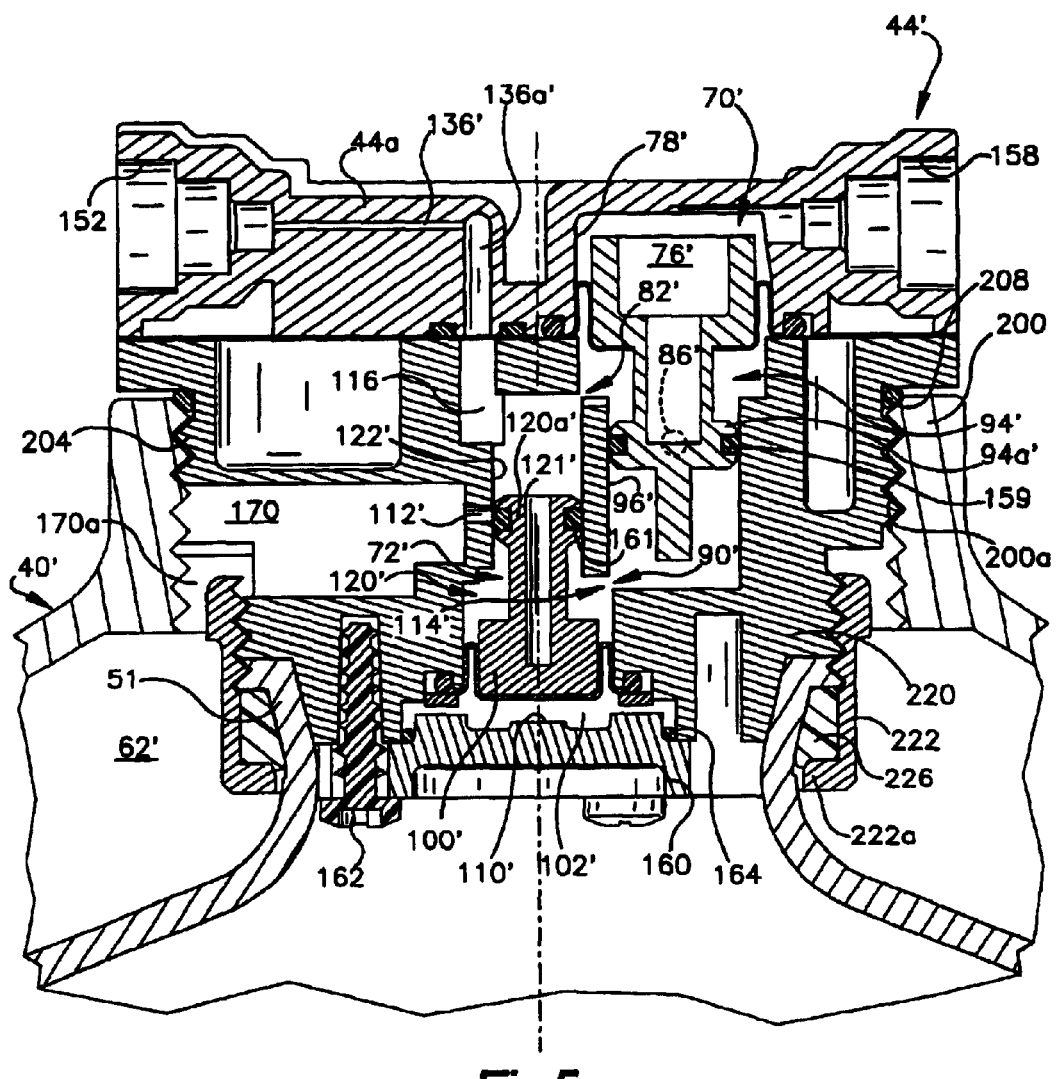
FIG. 5 is an enlarged fragmentary view of a portion of the control valve and tank assembly as indicated by the detail line 5—5 in FIG. 4.
Figure 6:
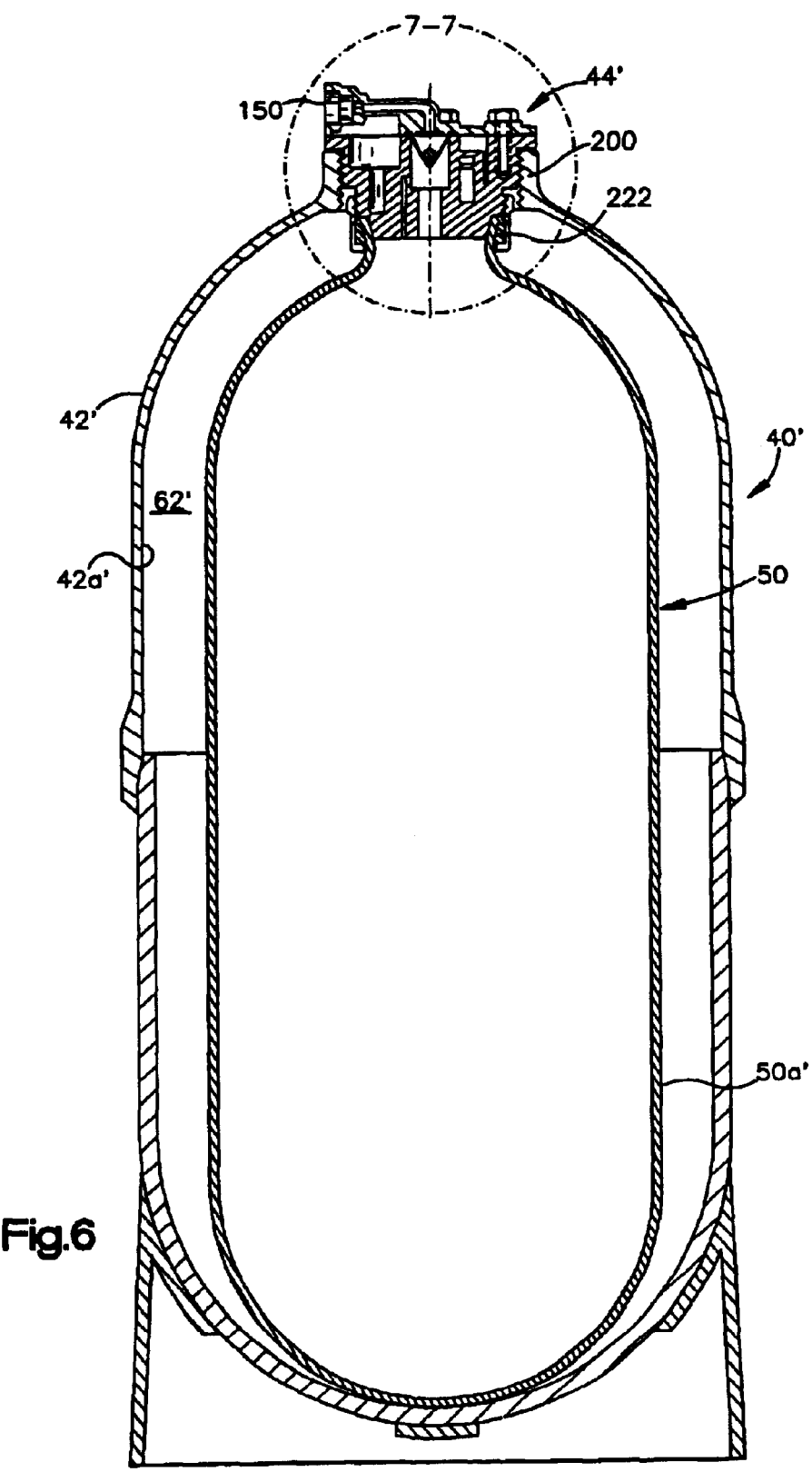
FIG. 6 is a sectional view of the control valve and tank assembly as seen from a plane indicated by the line 6—6 in FIG. 3; and, FIG. 7 is an enlarged, fragmentary view of a portion of the control valve and tank assembly as indicated by the detail line 7—7 in FIG. 6.

Referring now to FIG. 5, the components that comprise the control valve 44' (represented schematically in FIGS. 1 and 2) are shown in an actual control valve constuction. The valve housing 44a which may be in assemblage of individual housing elements, defines a plurality of ports (shown best in FIG. 3). In particular, the housing defines a tank outlet port 150, a source water feed port 152, a permeate or product port 154, a drain port 156 and a signal port 158. Referring to FIGS. 1 and 2, in an actual system the above-identified ports would be connected as follows. The tank port 150 would connect to the conduit 140. The feed port 152 would connect to the conduit 136. The permeate port 154 would connect to the permeate supply port 18 of the RO unit 14 via conduit 52. The signal port 158 would be connected to the conduit 80.

The housing 44a at least partially defines the pilot valve 70'. Referring, in particular to FIG. 5, the housing 44a reciprocally mounts the diaphragm carried pilot piston 76' in the piston char 78' at least partially defined by the valve 44a. The piston chamber 78' communicates with the signal port 158. As explained above the port 158 is connected to the signal line 80 (shown in FIGS. 1 and 2) which in turn, communicates with the faucet feed line 144 (shown schematically in FIG. 1). In the actual embodiment, flexible conduit is used to connect the port 158 with the faucet supply line and/or the output port of the post filter 32 using a suitable fitting.

The piston 76' is connected to a spool 94' including a land 94a'; the land 94a' sealingly engages the inside of the spool chamber 96'. An O-ring 159 effects a seal between the land 94a' and the spool chamber 96' while permitting reciprocating movement in the land 94a'. As described in connection with FIGS. 1 and 2, the land 94a controls the communication of a common port 86' (shown in phantom) with either the source water port 82' or the drain port 90'. In the actual valve construction, the ports 82' and 90' may be formed by wall openings defined in the body of the valve, rather than precisely defined ports. This is the construction shown in FIG. 5.

The servo valve 72' (the position of which is controlled by the pilot valve 70) is located immediately adjacent the pilot valve 70'. It includes a diaphragm supported piston 100' that at least partially defines a piston chamber 102'. A stop 110' determines the lowermost position of the piston 100'. As explained above, the piston is connected to a spool 120' which carries a land 120a' that is slidably movable within a spool chamber 122'. An O-ring 161 is mounted to the land 120a' land sealingly engages the inside of the spool chamber 122'. The spool 120a' controls the communication of the common port 112' with the a drain port 114' and the source water port 116'. As explained above, the ports themselves may be defined by openings formed in the valve body/housing, rather than precisely defined ports.

As seen in FIG. 5, the piston chamber 102' is at least partly formed by a bottom cap 160 that is secured to the rest of the valve body by a plurality of threaded fasteners 162 (only one is shown). The interface between the cap and the rest of the valve body is sealed by an O-ring 164.

As seen best in FIG. 5, source water from the source water port 152 is delivered to the spool chamber 122' by the passage 136' which is connected to the spool chamber by a branch passage 136a'. When the servo piston 100' is moved to its lowest position as viewed in FIG. 2, source water is communicated from the port 116' to the common port 112' (via the spool chamber 122'). The common port 112' delivers the source water to a cavity 170 formed in the control valve that communicates with the region 62' via passage 170a.

When the piston 100' moves to its upper position, the common port 112' communicates with the drain port 114' which, as seen in FIG. 5, communicates directly with the drain port 90' of the pilot valve 70'. A passage (not shown) communicates these drain ports with the drain 22 (see FIG. 1) via the control valve drain port 156 which is connected to an actual drain via a suitable conduit.

When the servo valve piston 100' is in its upper position (shown in FIG. 1), the region 62' is communicated with the drain 22 (FIG. 1) and, hence, permeate produced by the RO unit 14 (shown in FIG. 1) enters the bladder 50' gradually expanding the bladder. The actual passage 52 that is shown schematically in FIG. 1, is suitably molded within the valve housing.

When permeate is being delivered to the faucet 12 (shown in FIG. 1) the region 62' is pressurized upon movement of the servo valve piston 100' to its lower position at which point the common port 112' communicates with the source water port 116'. In this position of the piston 100' source water under source pressure to is delivered to the region 62' tending to contract the bladder 50' thus, driving permeate from the bladder.

Figure 7:
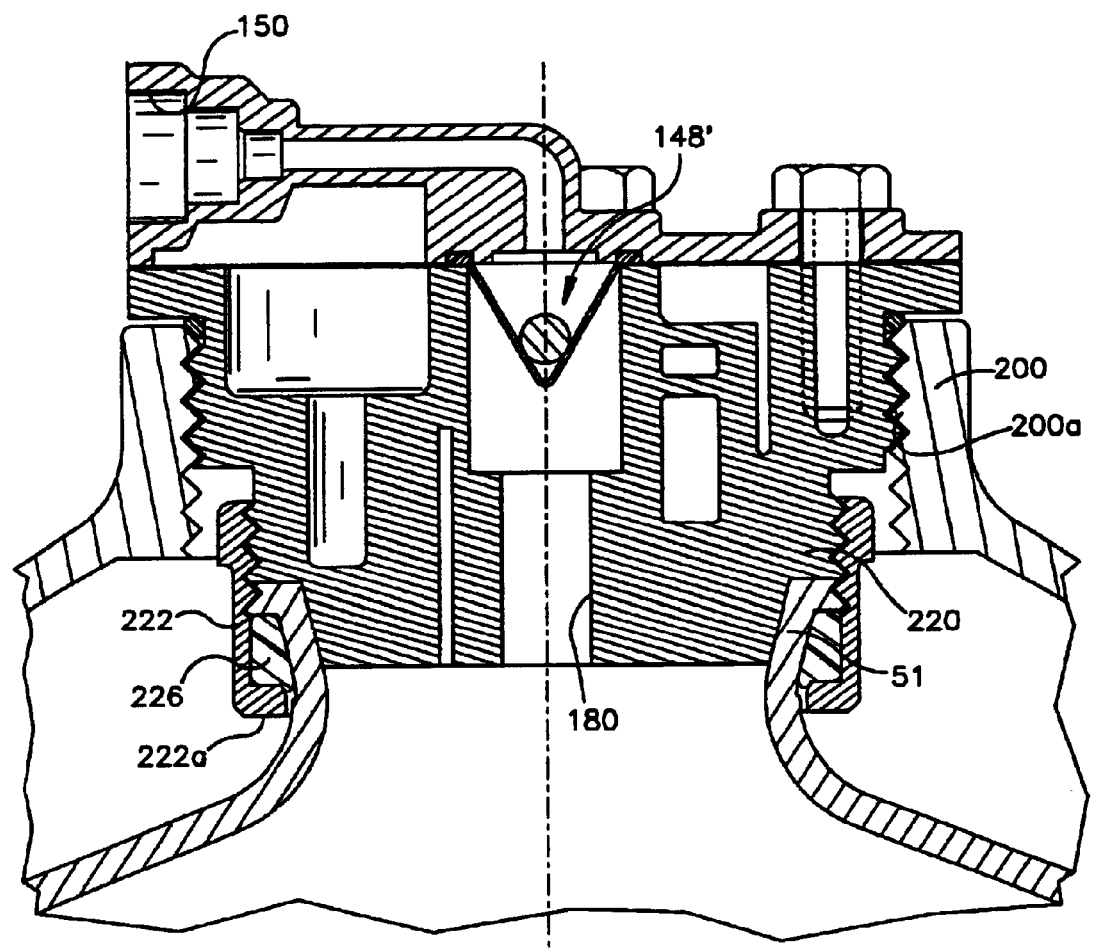

As seen best in FIG. 7, permeate is delivered through a passage 180 formed in the body of the control valve which communicates with a check valve 148'. The check valve 148' in turn communicates with the discharge or tank port 150 formed in the valve housing. The discharge/tank port 150 is connected to the post filter 32 by a conduit (not shown) represented by the line 52 in FIGS. 1 and 2.

Figure 4:
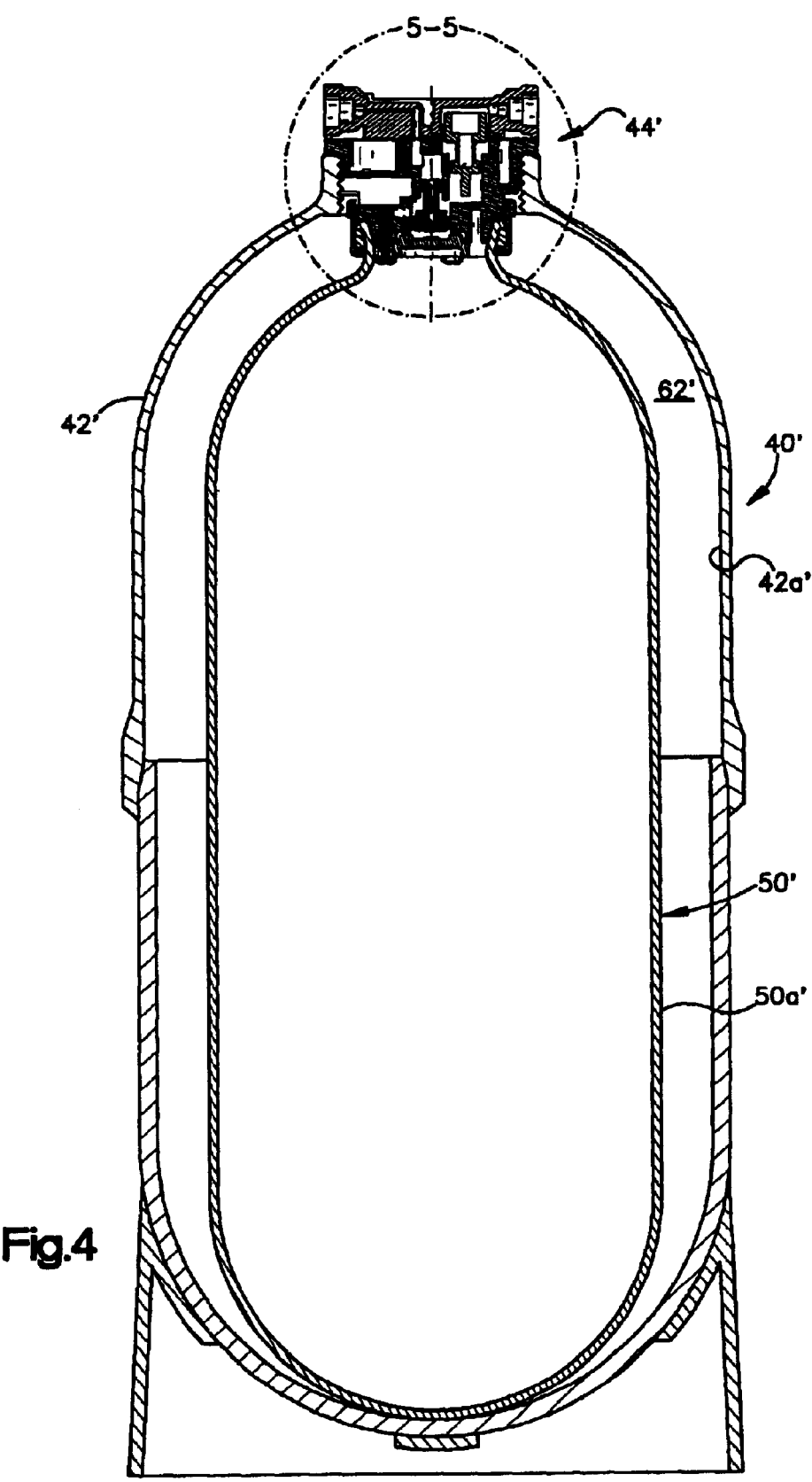
FIG. 4 is a sectional view of the control valve and storage tank assembly as seen from the plan indicated by the line 4—4 in FIG. 3.

Referring to both FIGS. 4 and 5, the control valve 44' is threadedly mounted to the top of the tank 40'. In particular, the tank 40' includes a neck 200 having an internal thread 200a. A complementary thread 204 is formed on the outside of the valve body and is threadedly engageable with the neck 200 of the tank 40'. An O-ring 208 seals the interface between the tank 40' and the control valve 44', but allows the control valve 44' to be removed from the tank 40' for replacement and/or service.

As seen best in FIG. 5, the bottom portion of the control valve 44' includes a depending, threaded portion indicated generally by the reference character 220. The threaded portion provides a releasable securement for the bladder 50'. In particular, a threaded collar or retaining nut 222, is threadedly received by the lower portion 220 of the control valve 44'. The retainer 222 includes an inwardly directed flange portion 222a, which supports a bladder retaining bearing 226; the bearing 226 facilitates rotation of the retaining nut 222 and simplifies installation of the bladder 50'. The bladder 50' includes a neck portion 51 that is captured between the bladder retaining bearing 226 and a tapered or cone-shaped segment 228 defined on the lower portion 220 of the control valve 44'. When the collar 222 is threaded onto the control valve portion 220, the bearing 226 is urged into sealing contact with the neck 51 of the bladder 50' and secures the bladder to the cone-shaped portion 228 of the control valve 44'.

With the disclosed storage system, permeate is delivered at a substantially constant pressure to the tap and, as a result, maximum flow rates to the tap are maintained regardless of the amount of permeate in the tank. In addition, because the pressurizing region 62 is substantially zero when permeate is being produced by the reverse osmosis system, the production rate of the RO unit is maximized since it does not see increased resistance as the storage tank fills, as is the case with precharged storage tanks.

Although the invention has been described with a certain degree of particularity, it should be understood that various changes can be made to those skilled in the art without departing from the spirit or scope of the invention as hereinafter claimed.

We claim:

1. A reverse osmosis system comprising:
   a) a reverse osmosis unit having a source water input communicating with a source pressure, a permeate output and a concentrate output;
   b) a storage tank for storing permeate discharged by said reverse osmosis unit, comprising:
      i) a tank housing;
      ii) an elastomeric bladder contained with said housing and;
      iii) structure defining a pressurizing region between an outside of said bladder and an inside of said tank housing;
   c) a control valve assembly, comprising:
      i) a pilot valve responsive to the opening and closing of a permeate dispensing device through which permeate stored in said bladder is dispensed;
      ii) said pilot valve including a flow control element movable between a first and second positions;
      iii) said control element moving to said first position when permeate is not being dispensed by said dispensing device and moving to said second position when permeate is being dispensed by said dispensing device;
      iv) a servo valve responsive to the positions of said pilot valve control element, such that when said pilot valve element is in its first position a flow control member within said servo valve moves to a first position at which said pressurizing region in said tank is communicated with a drain;
      v) said servo valve flow control member moving to said second position in response to movement of said pilot valve element, wherein said pressurizing region of said tank is communicated with said source pressure, whereby contracting forces are applied to said bladder in order to drive permeate from said bladder of said tank and to said dispensing device.

2. A storage device for storing treated water discharged by a water treatment unit, comprising:
   a) a tank assembly including an outer tank housing enclosing within it, an expandable bladder;
   b) a pressurizing region defined between an outside of said bladder and an inside of said outer tank housing;
   c) a valve member for controlling the communication of a source water under pressure with said pressurizing region and for controlling the communication of said pressurizing region with a drain, said source of water being water obtained upstream of said water treatment unit;
   d) a fluid pressure operated control device responsive, via a signal passage, to a dispensing device for said treated water, said control device operative to connect said source water to said pressurizing region when said dispensing device is dispensing treated water and operative to communicate said pressurizing region with said drain when said dispensing device is not dispensing water.

3. The apparatus of claim 2, wherein said control device includes a pilot valve responsive to a fluid pressure at said dispensing device and movable between at least two positions and said valve member comprises a servo valve responsive to the position of said pilot valve.

4. The apparatus of claim 3, wherein said pilot valve includes a source water port, a common port, and a drain port.

5. The apparatus of claim 4, wherein said pilot valve further includes a piston operated land for controlling the communication between said common port and said source port and between said common port and said drain port.

6. The apparatus of claim 5, wherein said a servo valve comprises a source water port, a common port and a drain port.

7. The apparatus of claim 6, wherein said servo valve further includes a piston operated spool valve for controlling the communication of said common port with said source water port and said drain port, said common port and drain port being sized to permit relatively unrestricted flow of source water out of said pressurizing region of said tank assembly when said servo valve common port and servo valve drain port are cross communicated by said spool valve.

8. The apparatus of claim 7, wherein said water treatment unit comprises a reverse osmosis module having a permeate output, a source water input and a concentrate output.

9. The apparatus of claim 8, further including a post filter disposed between a supply conduit communicating with said tank assembly and said dispensing device whereby treated water dispensed from said tank assembly tank is conveyed through said post filter before being dispensed.

10. A storage system for a reverse osmosis system, comprising:
    a) a storage tank having a tank housing enclosing an elastomeric, expandable bladder;
    b) said tank housing and bladder defining therebetween a pressurizing region for receiving fluid under pressure for exerting contracting forces on said bladder to expel permeate contained in said bladder;
    c) a pilot valve responsive, via a signal passage, to the state of a dispensing device such that said pilot valve moves to a first position when permeate is being dispensed by said dispensing device and moves to a second position when said dispensing device is not dispensing permeate; and,
    d) a servo valve responsive to said pilot valve and operative to communicate source water under pressure to said pressurizing region of said storage tank when said pilot valve is in its first position and operative to communicate said pressurizing region with a drain when said pilot valve is in its second position.

11. The apparatus of claim 10, wherein said pilot valve is responsive to pressure in a permeate supply line feeding said dispensing device.

12. A storage assembly for storing treated water discharged by a water treatment unit, comprising:
  a) a tank assembly including an outer tank housing and enclosing within it an expandable bladder;
  b) structure defining a pressurizing region defined between an outside of said bladder and an inside of said outer housing;
  c) a control valve mounted to said outer tank housing;
  d) said control valve including a depending, threaded segment extending into an interior of said tank housing; and,
  e) a threaded retaining element threadedly receivable by said control valve segment and operative to capture a neck portion of said bladder between itself and an engagement surface defined by said depending segment.

13. The apparatus of claim 12, further including a retaining element bearing disposed between said retainer and said bladder neck portion which facilitates relative rotation between said bladder and said retaining element.

* * * * *